United States Patent [19]

Pilhall

[11] 4,109,930
[45] Aug. 29, 1978

[54] TOWING DEVICE FOR MOTOR VEHICLES
[75] Inventor: Stig Tore Lennart Pilhall, Trollhättan, Sweden
[73] Assignee: AB Volvo, Gothenburg, Sweden
[21] Appl. No.: 683,030
[22] Filed: May 4, 1976
[30] Foreign Application Priority Data
May 6, 1975 [SE] Sweden ............................ 7505233
[51] Int. Cl.² ............................................. B60D 1/06
[52] U.S. Cl. ............................ 280/491 B; 293/69 R
[58] Field of Search ........... 280/491 B, 491 R, 491 D, 280/491 E, 498, 500, 495; 293/69 R, 71 R, 71 P
[56] References Cited
U.S. PATENT DOCUMENTS

| 3,480,296 | 11/1969 | Starling | 280/491 R |
| 3,639,748 | 2/1972 | Pearson | 293/71 R |
| 3,774,949 | 11/1973 | Eger | 280/491 R |

FOREIGN PATENT DOCUMENTS

| 2,227,739 | 12/1974 | France | 280/491 B |
| 2,339,637 | 2/1975 | Fed. Rep. of Germany | 280/500 |

Primary Examiner—John A. Pekar
Attorney, Agent, or Firm—Young & Thompson

[57] ABSTRACT

The invention relates to a towing device for motor vehicles, preferably passenger cars, having a rear bumper which to a great extent comprises a soft, energy-absorbing portion which is attached to a rigid beam attached to the vehicle. The towing device comprises an upwardly directed portion which is shaped as a ball and connected to the bumper and which, in a storage position, is covered by a removable or slidable portion of the bumper. The ball portion is connected to the bumper beam in such a manner that it can be moved between the storage position in which it at least to a great extent is withdrawn into a storage space in the bumper beam and a towing position completely outside of said storage space, said removable or swingable portion being formed of a portion of the soft portion of the bumper.

4 Claims, 3 Drawing Figures

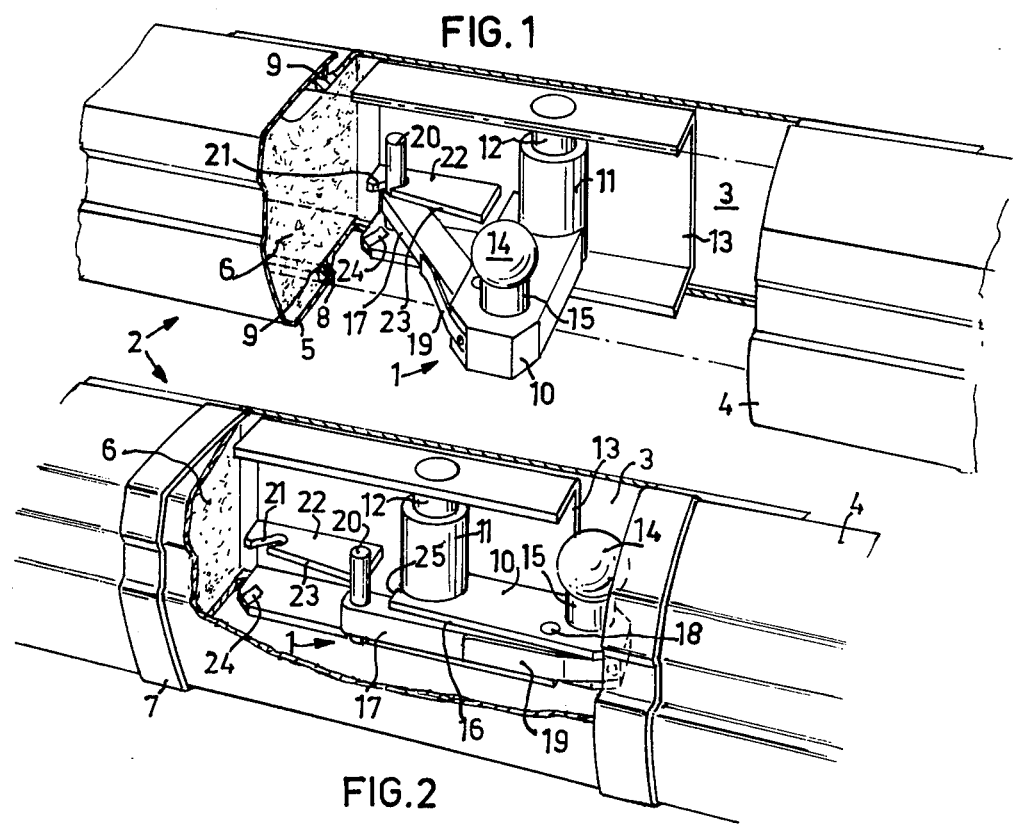
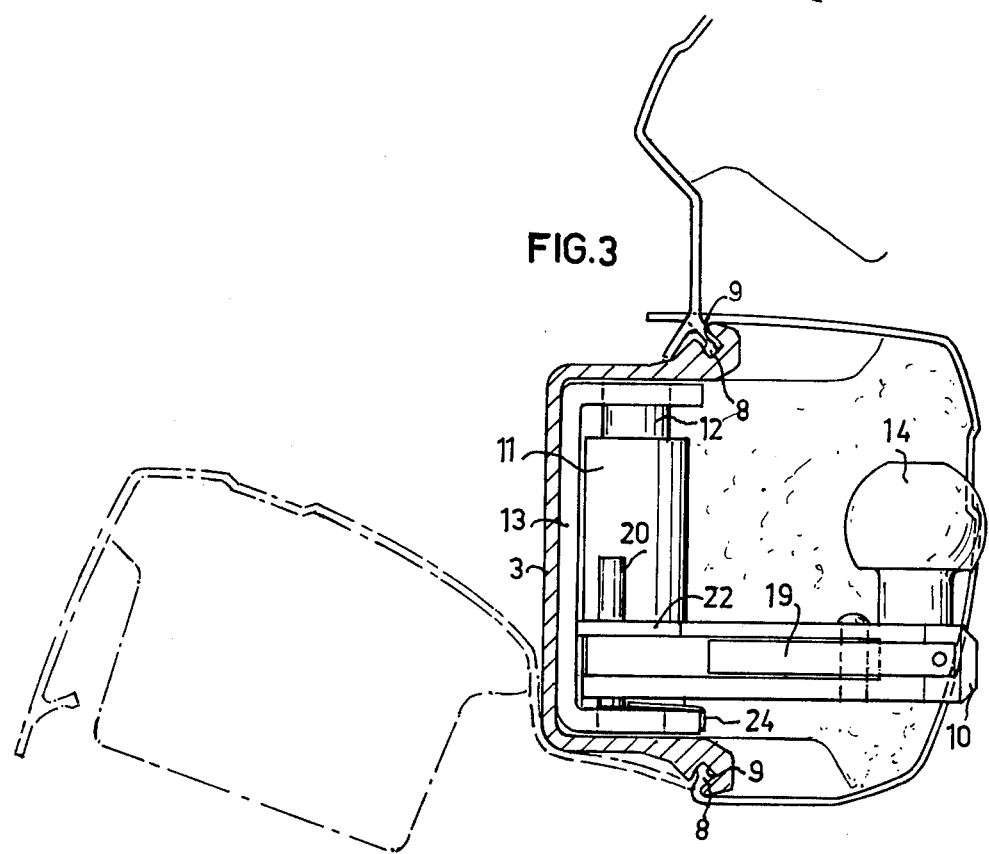

TOWING DEVICE FOR MOTOR VEHICLES

The present invention relates to a towing device for motor vehicles, preferably passenger cars, having a rear bumper in the form of a rigid beam attached to the vehicle and having a backwardly-directed soft, energy-absorbing portion the towing device comprising an upwardly-directed part which is shaped like a ball and connected to the vehicle. Practically all passenger cars with towing devices of this type have the towing device rigidly mounted in such a manner that the outer portion of the towing bar with the ball permanently extends back behind the car's rear bumper. In today's cars which are equipped with increasingly effective bumpers with the capacity in many cases to withstand a barrier crash at 8 km/h or more without damage, this means that the effect of the soft energy-absorbing bumper will be lost in many cases, since the steel ball when it is not being used would remain as a battering ram outside the bumper.

It is known to arrange removable towing devices, therby avoiding the above mentioned disadvantages. The disadvantage of this solution however, is that a heavy dirty part must be taken off and laid, for example in the trunk when it is not being used. Assembly and disassembly requires manipulation of fastening means, such as bolts, cotter pins and the like. Furthermore because of the human factor there is always the risk that the anchoring means might not be mounted correctly with the resulting risk that the towing means not be secured and could therefore release while driving. For these reasons, among others, removable towing devices have not had any extensive practical use.

There have also been attempts to make towing devices with a towing ball which can be pushed in under the bumper. Because of their construction they are difficult to handle and their relatively long powerful towing bars can easily damage the fuel tank in a rear end collision.

The purpose of the present invention is to achieve a safe towing device whose ball can easily and without the help of tools, and without the necessity of handling anchoring parts, be adjusted between a towing position and a protected storage position in which it does not project out from behind the soft, energy-absorbing portion of the bumper.

According to the invention, this is achieved by means of the ball portion being connected to the bumper beam in such a manner that it can be moved between a storage position near the bumper beam and a towing position at a distance from the bumper beam, the ball portion area of the soft, energy-absorbing portion of the bumper having a removable or swingable portion.

By means of the present invention, an easily accessible towing device is obtained. One need not bend down under the rear end of the automobile and there handle soiled parts. Rather, one need merely swing aside the soft portion in front of the towing device and forward the ball portion to the towing position. The invention entails that the ball portion need not project out from behind the rear defining surface of the bumper, and this, in turn, entails that, compared with previous constructions, the overhang and therewith the pitching movement of the vehicle are reduced. By means of the ball portion not being removable and instead merely being movable between the protected storage position behind the soft portion of the bumper and the towing position, the risk is minimal that the trailer will come loose even if the towing device were improperly locked by a cooperating locking arrangement.

A very simple and simultaneously secure device is obtained if the ball portion is arranged at one end of a towbar whose opposite end is connected to the bumper beam via a rotary connection having a vertical rotary axle, whereby the towbar can be swung between a backwardly directed towing position and a side-directed storage position.

In order to obtain the most simple conversion possible together with secure locking of the towbar, the towbar is, in a further development of the invention, provided with a locking arrangement which comprises a locking arm positioned at one end of said locking arrangement and rotatable around a vertical axle, the other end of said locking arrangement being provided with a locking pin which, in the towing position of the towbar, is arranged to engage in a horizontal slot so as to achieve a rigid connection between the bumper and the towbar, said locking arm being journalled in either the bumper or the towbar while the slot is arranged in the other in such a manner that, in the engagement position, the locking arm extends essentially perpendicular to the slot in which the locking pin is held by a spring loading the locking arm. When the towbar is swung out to the towing position, the locking pin will automatically engage in the slot as a result of the influence of the spring. The right angle between the locking arm and the slot ensures that no forces attempt to force the locking pin out of the slot when the locking arm is subjected to alternating tractive forces and thrust resulting from the influence of the trailer on the towbar.

The invention is described in more detail below with reference to the enclosed drawing showing an embodiment of the invention, in which FIG. 1 is a perspective view of an energy-absorbing bumper having a towing device according to the invention, said towing device being in the towing position, FIG. 2 is a view corresponding to FIG. 1 in which the towing device is in the collapsed position and FIG. 3 is a cross-section through the bumper with the towing device as seen from the side.

The towing device which is generally denoted 1 is attached to an energy-absorbing bumper 2 comprising a backwardly open U-beam 3 which is rigidly attached to the vehicle and has an energy-absorbing soft part 4 of flexible material. The soft part 4, which is composed of an outer casing 5 of, for example, hard rubber, and an inner filling 6 of a softer material, for example plastic foam, is divided in the towing device area and has there a middle portion 7 which can be swung aside. The edges 8 of the outer casing 5 are situated in grooves 9 in the U-beam and one edge 8 of the portion 7 which can be swung aside can be loosened from its groove 9 so that said portion can be swung upwards or downwards as is indicated in FIG. 3 in order to expose the towing device. Alternatively, portion 7 can be loosened entirely. In the opened or swung-aside position, portion 6 is held by means which are not shown here.

The towing device 1 comprises a towbar 10, the inner end of which has a sleeve 11 which is rotatably journalled on an axle 12 which, in turn, is held between the horizontal flanges on a U-shaped attachment plate 13. Said plate 13 is welded onto the bumper beam 3. The outer end of the towbar 10 carries a ball 14 on a short neck 15. By means of this construction, the ball 14 can be moved from the towing position shown in FIG. 1 to the storage position shown in FIG. 2, in which latter position both the ball and the towbar lie protected in front of the rear plane of the U-beam 3.

The towbar 10 has a longitudinal recess 16 extending along one side of the same, an arm 17 being rotatably journalled on an axle 18 in the proximity of the outer end of said towbar. The arm 17 is spring loaded against the towbar 10 by means of a plate spring 19 which is rigidly attached to the same. The free end of arm 17 is provided with a vertical pin 20 which, in the towing position of the towing device shown in FIG. 1, engages in a horizontal slot 21 in a plate 22 connected to the attachment plate 13. The pin 20 is held in the slot 21 by means of the influence of the spring 19. As can be seen in FIG. 1, the slot 21 extends perpendicular to the arm 17 so that no forces attempt to force the pin 20 out of the slot 21 no matter if the arm 17 is subjected to tractive forces or thrust.

The width of the plate 22 increases successively to the right and its length is selected so that the pin 20 abuts the rear edge 23 of the same in the side-directed position of the towbar 10 as well. When the towbar is swung in from the position shown in FIG. 1 to the position shown in FIG. 2, the pin will slide against the edge 23 and, by means of the influence of the spring, the edge forces the towbar via the pin to its inner position. The arm 17 is hereby forced into the recess 16. The pin projects above the arm 17 to such an extent that it serves as a suitable finger grip when the device is to be swung into the bumper. As soon as the pin 20 has been forced out of the slot 21, the towbar is automatically swung in. When the towbar 10 is swung out, the pin slides against the edge 23 in the opposite direction and is automatically forwarded into the slot 21. In order to prevent involuntary collapse, for instance, in the event of spring breakage, an extra stop in the form of a locking tongue 24 can, as is shown in FIG. 1, be arranged, said tongue preventing the pin from sliding out of the slot.

As an extra security measure, the bearing casing of the towbar 10 shown in the embodiment is asymmetrically positioned and the towbar 10 has a rear stop surface 25 which restricts the swinging movement to 90°.

What I claim is:

1. In combination a towing device and a rear bumper for vehicles, said bumper comprising a rigid beam attached to the vehicle and a soft, elongated energy-absorbing member attached to a rearwardly facing side of the rigid beam, said energy-absorbing member being formed with a storage space having a cover which is movable to uncover said storage space, said towing device comprising an upwardly-directed ball-shaped portion attached to one end of a towbar whose opposite end is pivotably connected to a mounting means attached to said rigid beam within said storage space in such a manner that the towbar is pivotable between an uncovered backwardly-directed towing position in which the ball-shaped portion is positioned completely outside said storage space, and a covered side-directed storage position within said storage space, and a locking arm pivotably journalled at one end in one of said towbar and said rigid beam for swinging movement around a vertical axle, said locking arm at the other end having a locking member that removably engages in means connected to the other of said towbar and said rigid beam so as to provide a rigid connection between the rigid beam and the towbar when the towbar is in said towing position.

2. The combination according to claim 1, wherein said locking arm is journalled in the outer end of said towbar and said locking member is a locking pin engageable in a slot connected to said rigid beam, said slot being substantially perpendicular to the locking arm when said pin is in said slot.

3. The combination according to claim 2, wherein said locking arm is resiliently loaded against the towbar in order to force the locking pin into the slot when the towbar is moved from the side-directed position to the towing position and to hold the locking pin in contact with a surface on means connected to the rigid beam so as to force the towbar toward the side-directed position when the locking pin is removed from the slot.

4. The combination according to claim 3, wherein the towbar has a longitudinal recess which opens toward the locking arm, said recess at least partially receiving the locking arm in the side-directed position of the towbar.

* * * * *